(12) United States Patent
Heilig

(10) Patent No.: US 11,458,650 B2
(45) Date of Patent: Oct. 4, 2022

(54) MIXING DRUM DRIVE

(71) Applicant: ZF Friedrichshafen AG, Friedrichshafen (DE)

(72) Inventor: Eduard Heilig, Friedrichshafen (DE)

(73) Assignee: ZF FRIEDRICHSHAFEN AG, Friedrichshafen (DE)

(*) Notice: Subject to any disclaimer, the term of this patent is extended or adjusted under 35 U.S.C. 154(b) by 161 days.

(21) Appl. No.: 16/640,748

(22) PCT Filed: Aug. 9, 2018

(86) PCT No.: PCT/EP2018/071591
§ 371 (c)(1),
(2) Date: Feb. 21, 2020

(87) PCT Pub. No.: WO2019/038096
PCT Pub. Date: Feb. 28, 2019

(65) Prior Publication Data
US 2020/0198182 A1 Jun. 25, 2020

(30) Foreign Application Priority Data
Aug. 24, 2017 (DE) ...................... 10 2017 214 854.3

(51) Int. Cl.
*F16H 1/46* (2006.01)
*B28C 5/42* (2006.01)
(Continued)

(52) U.S. Cl.
CPC ............ *B28C 5/4217* (2013.01); *F16H 1/46* (2013.01); *F03D 80/70* (2016.05);
(Continued)

(58) Field of Classification Search
CPC ....... B28C 5/4217; F16H 1/46; F16H 57/082; F03D 80/70; F16C 2320/16
See application file for complete search history.

(56) References Cited

U.S. PATENT DOCUMENTS

2008/0273416 A1 11/2008 Heilig
2015/0306786 A1* 10/2015 Pirri ...................... B60W 10/30
366/60

FOREIGN PATENT DOCUMENTS

CN 103115113 A 5/2013
DE 102005012823 A1 9/2006
(Continued)

*Primary Examiner* — Derek D Knight
(74) *Attorney, Agent, or Firm* — Leydig, Voit & Mayer, Ltd.

(57) ABSTRACT

A mixing drum drive includes first, second, and third rotational speed reduction stages, an electric motor having a length similar to its diameter, a component for fastening the electric motor, and a bearing by which a component for fastening a mixing drum is rotatable. A component with a gear of the first rotational speed reduction stage is configured to be driven by the electric motor and a further component with a gear of the first rotational speed reduction stage drives a component with a gear of the second rotational speed reduction stage. A further component with a gear of the second rotational speed reduction stage drives a component with a gear of the third rotational speed reduction stage and a further component with a gear of the third rotational speed reduction stage drives the component for fastening the mixing drum.

11 Claims, 1 Drawing Sheet

(51) Int. Cl.
 *F03D 80/70* (2016.01)
 *F16H 57/08* (2006.01)
 *F16H 1/28* (2006.01)

(52) U.S. Cl.
 CPC . *F05B 2260/40311* (2013.01); *F16C 2320/16* (2013.01); *F16H 57/082* (2013.01); *F16H 2001/2881* (2013.01)

(56) References Cited

FOREIGN PATENT DOCUMENTS

| | | | | |
|---|---|---|---|---|
| DE | 102008043152 A1 | 4/2010 | | |
| JP | 5610848 A | 2/1981 | | |
| JP | 2003226192 A | 8/2003 | | |
| WO | WO 2006015835 A1 | 2/2006 | | |
| WO | WO 2006131335 A2 | 12/2006 | | |
| WO | WO 2013045070 A1 | 4/2013 | | |
| WO | WO-2016015864 A1 * | 2/2016 | ............. | F16D 3/185 |
| WO | WO 2016015864 A1 | 2/2016 | | |

\* cited by examiner

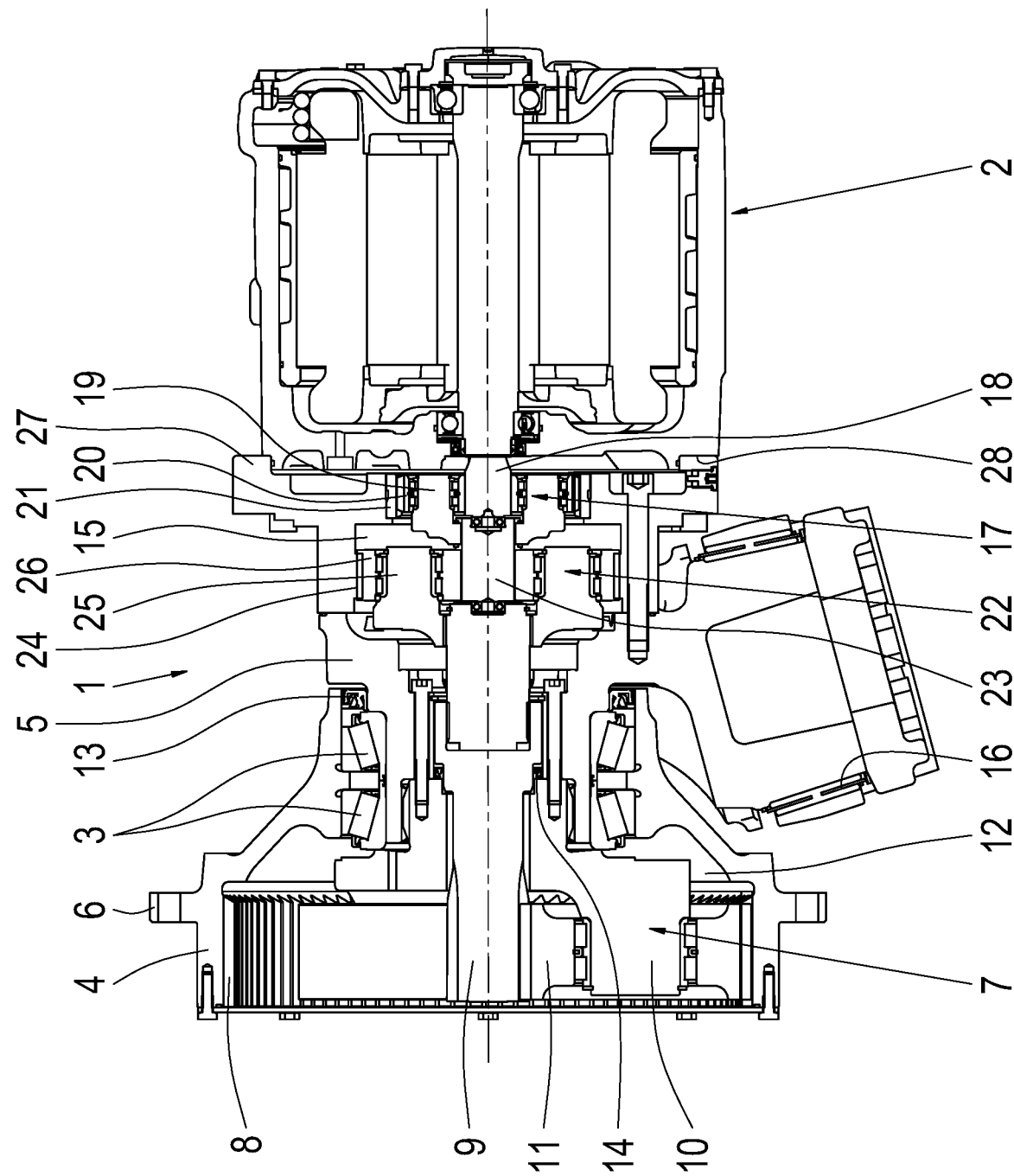

MIXING DRUM DRIVE

CROSS REFERENCE TO RELATED APPLICATIONS

This application is a U.S. National Phase application under 35 U.S.C. § 371 of International Application No. PCT/EP2018/071591 (WO 2019/038096 A1), filed on Aug. 9, 2018, and claims benefit to German Patent Application No. DE 10 2017 214 854.3, filed on Aug. 24, 2017.

FIELD

The invention relates to a mixing drum drive, and more specifically to a mixing drum drive with multiple rotational speed reduction stages.

BACKGROUND

Generic mixing drum drives are suitable for driving a mixing drum of a truck mixer in both directions of rotation by an electric motor in order, for example, to draw concrete into the drum and to convey the concrete out of the mixing drum again in the opposite direction of rotation in order to empty the mixing drum.

A mixing drum drive with an electric motor is disclosed, for example, in JP 2003 226 192 A2.

SUMMARY

In an embodiment, the present invention provides a mixing drum drive. The mixing drum drive includes a first rotational speed reduction stage, a second rotational speed reduction stage, a third rotational speed reduction stage, an electric motor, a component for fastening the electric motor, and a bearing by which a component for fastening a mixing drum is rotatable. A component with a gear of the first rotational speed reduction stage is configured to be driven by the electric motor and a further component with a gear of the first rotational speed reduction stage drives a component with a gear of the second rotational speed reduction stage. A further component with a gear of the second rotational speed reduction stage drives a component with a gear of the third rotational speed reduction stage and a further component with a gear of the third rotational speed reduction stage drives the component for fastening the mixing drum. The third rotational speed reduction stage is arranged on one side of the bearing, and the first rotational speed reduction stage and the second rotational speed reduction stage are arranged on the other side of the bearing. The electric motor has a length similar to its diameter.

BRIEF DESCRIPTION OF THE DRAWINGS

The present invention will be described in even greater detail below based on the exemplary FIGURE. The invention is not limited to the exemplary embodiment. All features described and/or illustrated herein can be used alone or combined in different combinations in embodiments of the invention. The features and advantages of various embodiments of the present invention will become apparent by reading the following detailed description with reference to the attached drawing which illustrates the following:

The FIGURE shows a mixing drum drive to which an electric motor is flanged and thus connected.

DETAILED DESCRIPTION

The present application describes a reliably operable and compactly designed mixing drum drive for driving a mixing drum of a truck mixer by an electric motor.

The present application describes a mixing drum drive having three rotational speed reduction stages, wherein a first and a second rotational speed reduction stage are arranged on one side of the bearing, and the third rotational speed reduction stage is arranged on the other side of the bearing. The weight of the mixing drum, in particular also the support of the mixing drum during braking operations, is absorbed via this bearing, which simultaneously enables the rotation of the output of the mixing drum drive. For this purpose, the bearing is arranged on a component which carries the bearing and at the same time is connected indirectly or directly or in one piece with a component to which the electric motor can be flanged. This component, which carries the bearing, can be connected indirectly or directly to the base of the truck mixer via elastic elements. The details of how this component, which carries the bearing, is connected to the bearing block via the elastic elements can be taken from WO 2006/131335 A2, which is hereby incorporated in its entirety for fastening the mixing drum drive to the bearing block. The bearing does not allow tilting and thus permits only the support of the weight and braking forces of the mixing drum while at the same time allowing the mixing drum to rotate, whereby the first rotational speed reduction stage, the second rotational speed reduction stage and the third rotational speed reduction stage as well as the electric motor follow the movements of the mixing drum which occur as a result of deformation of the chassis of the truck mixer. This deformation of the chassis is thus absorbed exclusively via the elastic elements, whereby the entire remaining mixing drum drive follows the movements of the mixing drum.

Since the bearing is arranged between the second rotational speed reduction stage and the third rotational speed reduction stage, it is possible to position the heavy electric motor more closely to the component carrying the bearing and connected to the bearing block, whereby lower forces from a weight force of the electric motor act on the connections.

By using three rotational speed reduction stages which are preferably designed coaxially as three single-stage planetary gears, it is possible to use a higher-speed electric motor with a smaller diameter. If only one rotational speed reduction stage were used, the electric motor would have to be much larger. In the first rotational speed reduction stage, the sun gear preferably forms the drive and the planet carrier the output. It is also advantageous for the second rotational speed reduction stage if the sun gear forms the drive and the planet carrier forms the output. The third rotational speed reduction stage is designed such that the sun gear forms the drive and the ring gear forms the output, the planet carrier being held in a rotationally fixed manner.

In one or more embodiments, the first rotational speed reduction stage, the second rotational speed reduction stage or the third rotational speed reduction stage may also be designed as spur gears.

In one or more embodiments, the third rotational speed reduction stage is arranged in its own lubricating fluid chamber, i.e., the lubricating fluid chamber of the third rotational speed reduction stage is separated in a fluid-tight manner from the lubricating fluid chamber of the first rotational speed reduction stage and of the second rotational speed reduction stage. This makes it possible to optimally adapt the level of the lubricant to the individual rotational speeds of the rotational speed reduction stages. The first rotational speed reduction stage has the highest speed and thus would produce most lubricant churning losses. By selecting the suitable lubricant level, the efficiency can be considerably improved by reducing the churning losses.

Preferably, the flanged surface at which the electric motor is connected to the mixing drum drive has a greater radial extension than the ring gear of the first rotational speed reduction stage. As a result, the electric motor can be designed with a large diameter, which leads to a reduction in the axial installation length of the electric motor. Particularly in the case of a truck mixer, the installation space between the drum and the cab is very limited, as a result of which a short electric motor is advantageous. The electric motor can thus have a length similar to the diameter.

Additional features can be found in the description of the FIGURE.

The FIGURE shows a mixing drum drive 1 to which an electric motor 2 is flanged and thus connected. A bearing 3 connects the rotating component 4 to the stationary component 5. The stationary component 5 carries the bearing 3. The rotating component has a flange 6 to which a drum (not shown) of a truck mixer can be connected. The rotating component 4 is driven by the third rotational speed reduction stage 7. The third rotational speed reduction stage 7 has a ring gear 8 which is connected in a rotationally fixed manner to the rotating component 4 or is formed integrally therewith. Furthermore, the third rotational speed reduction stage 7 has a sun gear 9, a planet carrier 10 held in a rotationally fixed manner, and planet gears 11. The chamber 12 in which the third rotational speed reduction stage 7 is located is separated from the chamber 15 in a fluid-tight manner via the sealing element 14. The sealing element 13 seals the chamber 12 toward the outside from the environment. The stationary component 5 can be connected via elastic elements 16 to a base (not shown) of the premixer and is constructed as in WO 2006/131335 A2. The planet carrier 10 is connected to the stationary component 5 in a rotationally fixed manner via a toothing. The first rotational speed reduction stage 17 has a sun gear 18, a planet carrier 19, planet gears 20 and a ring gear 21. The second rotational speed reduction stage 22 has a sun gear 23, a ring gear 24, a planet carrier 25 and planet gears 26. The ring gear 24 and the ring gear 21 are arranged in the component 27 and are connected in a rotationally fixed manner thereto or integrally formed therewith, wherein the electric motor 2 can be connected to the component 27. Thus, the output shaft of the electric motor drives the sun gear 18, the planet carrier 19 drives the sun gear 23, the planet carrier 25 drives the sun gear 9 and the ring gear 8 then drives the mixing drum (not shown) of the truck mixer. The surface 28 via which the electric motor 2 can be connected to the component 27 is arranged radially outside of the radial extension of the ring gear 21. This makes it possible for the electric motor to be designable with a very large diameter and a shorter axial installation length. Since the first rotational speed reduction stage 17 and the second rotational speed reduction stage 22 are arranged on one side of the bearing 3, the electric motor 2 can move more closely to the stationary component 5 and thus to the base of the truck mixer, whereby the lever arm of the weight force of the electric motor 2 decreases.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

1 Mixed drum drive
2 Electric motor
3 Bearing
4 Rotating component
5 Stationary component
6 Flange
7 Third rotational speed reduction stage
8 Ring gear
9 Sun gear
10 Planet carrier
11 Planet gear
12 Chamber
13 Sealing element
14 Sealing element
15 Chamber
16 Elastic element
17 First rotational speed reduction stage
18 Sun gear
19 Planet carrier
20 Planet gear
21 Ring gear
22 Second rotational speed reduction stage
23 Sun gear
24 Ring gear
25 Planet carrier
26 Planet gear
27 Component
28 Surface

The invention claimed is:

1. A mixing drum drive, comprising:
a first rotational speed reduction stage;
a second rotational speed reduction stage;
a third rotational speed reduction stage;
an electric motor having a length similar to its diameter;
a component for fastening the electric motor; and
a bearing by which a component for fastening a mixing drum is rotatable,
wherein a component with a gear of the first rotational speed reduction stage is configured to be driven by the electric motor and a further component with a gear of the first rotational speed reduction stage drives a component with a gear of the second rotational speed reduction stage and a further component with a gear of the second rotational speed reduction stage drives a component with a gear of the third rotational speed reduction stage and a further component with a gear of the third rotational speed reduction stage drives the component for fastening the mixing drum, wherein the third rotational speed reduction stage is arranged on one side of the bearing, and the first rotational speed reduction stage and the second rotational speed reduction stage are arranged on the other side of the bearing; and wherein a lubricant chamber in which the third rotational speed reduction stage is arranged is separated in a fluid-tight manner from a lubricant chamber in which the second rotational speed reduction stage is arranged.

2. The mixing drum drive according to claim 1, wherein the first rotational speed reduction stage has a planetary gear with a ring gear, at least one planet gear, a planet carrier, and a sun gear, wherein the sun gear is the component, drivable by the electric motor, with a gear, and the ring gear is held in a rotationally fixed manner or the first rotational speed reduction stage has a spur gear.

3. The mixing drum drive according to claim 1, wherein the second rotational speed reduction stage has a planetary gear with a ring gear, at least one planet gear, one planet carrier, and a sun gear, wherein the sun gear is the component, driven by the first rotational speed reduction stage, with a gear, and the ring gear is held in a rotationally fixed manner or the second rotational speed reduction stage has a spur gear.

4. The mixing drum drive according to claim 1, wherein third rotational speed reduction stage has a planetary gear with a ring gear, at least one planet gear, a planet carrier and a sun gear, wherein the sun gear is the component, driven by the second rotational speed reduction stage, with a gear and the ring gear is connected in a rotationally fixed manner to the component for fastening the mixing drum.

5. The mixing drum drive according to claim 1, wherein a ring gear of the first rotational speed reduction stage and a ring gear of the second rotational speed reduction stage are arranged within the component for fastening the electric motor.

6. The mixing drum drive according to claim 1, wherein the component for fastening the electric motor is connected in a rotationally fixed manner to a component which carries the bearing.

7. The mixing drum drive according to claim 1, wherein a surface by which the electric motor can be fastened is arranged radially outside of a radial extension of the ring gear of the first rotational speed reduction stage.

8. The mixing drum drive according to claim 1, wherein the component which carries the bearing can be connected to a base of a truck mixer by elastic elements.

9. The mixing drum drive according to claim 1, wherein the third rotational speed reduction stage is arranged partly inside a mixing drum.

10. A truck mixer having a mixing drum and an electric motor and a mixing drum drive according to claim 1.

11. The truck mixer according to claim 10, wherein the electric motor follows the movements of the mixing drum resulting from torsions of a chassis of the truck mixer.

* * * * *